Patented Apr. 28, 1936

2,038,724

UNITED STATES PATENT OFFICE 2,038,724

ANTIFREEZE COMPOUND

Arthur Eichengrün, Charlottenburg, Germany, assignor to Celanese Corporation of America, a corporation of Delaware No Drawing. Application October 19, 1933, Serial No. 694,347. In Germany December 23, 1932

4 Claims. (Cl. 252—5)

This invention relates to the lowering of the freezing point of liquids and relates more particularly to the use of nitrites as anti-freeze compounds for water that is used under conditions wherein it is exposed to low temperatures.

An object of my invention is to provide antifreeze compounds that are more effective and useful than those previously employed. A further object of my invention is to avoid or decrease the danger of freezing of water or other liquid that is employed under such conditions that freezing of the same is liable to occur, by incorporating a metallic nitrite therein. Other objects of my invention will appear from the following detailed description.

As is known, water used for the cooling of engines of automobiles and water used as seals in gas holders or in gas conveying apparatus and conduits, can be protected against freezing by the addition of suitable substances to lower the freezing point of the same.

The substances essentially used for this purpose are organic liquids, especially simple and polyhydric alcohols and their derivatives. Of these, the monohydric alcohols, methyl alcohol and ethyl alcohol, are by far the most effective. However their use is not economical since they rapidly evaporate in whole or in part from the hot water used for cooling the internal combustion engine, with the result that safe protection against freezing, especially at very low temperatures, cannot be attained with them and periodic replenishment is necessary.

Of the polyhydric alcohols, such as glycol and glycerine, glycerine has but a slight anti-freeze effect and is quite ineffective at even slightly reduced temperatures. Glycol and its derivatives are more effective, but still at low temperatures they must be used in solutions of very high concentrations, in which they present a disadvantage of forming solutions of greatly increased viscosity. Their effect in normal concentration, say in the proportion of 1:3 is slight.

For instance, in the German Patent 468,917, the freezing limit of $-17.5°$ C. is given for the monomethyl ether of glycol; while according to German Patent 469,222, at $-24.2°$ C. a solution of a concentration as high as 50% must be used in the case of butylene glycol.

Inorganic compounds have heretofore not been found suitable, since on the one hand their effect in lowering the freezing point is entirely too small and they crystallize out upon cooling, and on the other hand, they consist mainly of metallic chlorides that cause corrosion of the metallic parts of the radiators or gas apparatus.

I have now found that the salts of nitrous acid are capable of imparting protection against freezing far exceeding that of any prior substances used for this purpose, inasmuch as sure protection against freezing can be obtained by employing such salts in concentrations considerably less than that required of substances previously used for this purpose.

Thus water used in radiators or gas apparatus, etc. containing salts of nitrous acid in the above mentioned proportions of 1:2 remain liquid at temperatures as low as $-50°$ C. Even in the proportions of 1:7, i. e. a solution of 15% concentration, the solution merely becomes pasty (through the formation of ice crystals) and does not lose its usefulness at a temperature of $-20°$ C., while for example glycol and even alcohol at 15% concentration show the same phenomenon at $-15°$ C. and almost freeze at $-10°$ C. and completely freeze at $-15°$ C.

The superiority of the salts of nitrous acid as an anti-freeze is evident, since a 15% solution of the same may be used in north temperate climates (while solutions of 33 to 40% concentration of other substances are prescribed) and even for use in arctic climates a solution of 33% concentration, i. e. the proportion of 1 part of salt to 2 parts of water, is sufficient.

The water soluble nitrites in general are useful for the present invention. Calcium nitrite is the most effective, sodium nitrite or a mixture of these two salts is somewhat less effective. Examples of other suitable metallic nitrites are potassium nitrite and barium nitrite. Because of this, any desired corrosion-preventing or retarding substances may be added to the anti-freeze salts without danger of precipitation and consequent reduction of their effectiveness. Examples of corrosion preventing or retarding compounds that may be added are quick lime or slaked lime, caustic soda solution, caustic potash, the carbonates of calcium, sodium or potassium, trisodium phosphate, sodium saccharate, etc. With the proper selection of the corrosion preventing substances, attack upon metals, especially iron, copper and zinc, may be safely prevented with small quantities of the same.

If desired, the salts of nitrous acid may be mixed with other less effective salts such as salts of nitric acid, or with the above named alcohols or their derivatives. However in general this involves an inexpedient increase in cost since an essential advantage of these nitrites is that they can be offered for sale in cheap pasteboard packages, while the liquid anti-freeze compounds are limited to careful and expensive packing.

Since solutions of the nitrites remain liquid at low temperatures, these may be employed for the thawing of ice or snow. Thus by injecting, spraying or pouring the nitrites of their solutions into half frozen gas pipes or onto various wood or metallic apparatus, containers, or parts that have become covered or clogged with ice, their mobility and usefulness may be restored in an emergency.

It is to be understood that the foregoing detailed description is given merely by way of illustration and that many variations may be made therein without departing from the spirit of my invention.

Having described my invention, what I desire and claim to secure by Letters Patent is:

1. The method of effecting heat transfer in a cooling system, which comprises circulating through said system an aqueous solution containing a salt of nitrous acid in sufficient proportion to lower the freezing point of the solution substantially below the freezing point of water.

2. The method of effecting heat transfer in a cooling system, which comprises circulating through said system an aqueous solution containing sodium nitrite in sufficient proportion to lower the freezing point of the solution substantially below the freezing point of water.

2. The method of effecting heat transfer in a cooling system, which comprises circulating through said system an aqueous solution containing calcium nitrite in sufficient proportion to lower the freezing point of the solution substantially below the freezing point of water.

4. An anti-freeze composition containing an aqueous solution of a salt of nitrous acid and trisodium phosphate.

ARTHUR EICHENGRÜN.